(12) United States Patent
Allen

(10) Patent No.: US 8,495,880 B2
(45) Date of Patent: Jul. 30, 2013

(54) THERMAL MANAGEMENT USING TOPOLOGICAL ISOMERIZATION OF FUEL

(75) Inventor: Edward H. Allen, Bethesda, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 1122 days.

(21) Appl. No.: 12/434,774

(22) Filed: May 4, 2009

(65) Prior Publication Data

US 2010/0275607 A1    Nov. 4, 2010

(51) Int. Cl.
*F02C 7/22*    (2006.01)
(52) U.S. Cl.
USPC ............. 60/734; 60/39.281; 60/736; 60/780; 60/723; 585/253; 585/332; 585/477
(58) Field of Classification Search
USPC .................. 585/253, 377, 363, 353, 332, 477; 60/39.281, 723, 734, 772, 736, 780
See application file for complete search history.

(56) References Cited

U.S. PATENT DOCUMENTS

| | | | |
|---|---|---|---|
| 2,891,908 A * | 6/1959 | Vaell ............................. 208/165 |
| 3,541,181 A | 11/1970 | Bercik et al. |
| 3,783,849 A * | 1/1974 | Bramfitt ........................ 123/576 |
| 4,255,605 A * | 3/1981 | Dixon ............................ 585/332 |
| 4,505,124 A * | 3/1985 | Mayer ............................. 62/180 |
| 5,232,672 A * | 8/1993 | Spadaccini et al. ........... 422/198 |
| 5,626,020 A | 5/1997 | Sangster et al. |
| 7,334,407 B2 * | 2/2008 | Spadaccini et al. ............. 60/723 |
| 7,514,590 B1 * | 4/2009 | Rice ............................... 585/738 |
| 8,015,823 B2 * | 9/2011 | Vanderspurt et al. ........... 60/777 |
| 2011/0067839 A1 * | 3/2011 | Norton et al. ............. 165/104.12 |

* cited by examiner

*Primary Examiner* — William H Rodriguez
*Assistant Examiner* — Steven Sutherland
(74) *Attorney, Agent, or Firm* — McDermott Will & Emery LLP

(57) ABSTRACT

Embodiments of a system are disclosed that include a heat source, an endothermic process module, and a fuel source configured to supply fuel to the endothermic process module and to receive isomerized fuel from the endothermic process module. A controller includes logic instructions operable to receive information regarding temperature of fuel received by the endothermic process module, and regulate application of heat from the heat source to the fuel at the endothermic process module. The endothermic process module includes a catalyst that increases the thermal carrying capacity of the fuel by isomerizing fuel from the fuel source.

16 Claims, 6 Drawing Sheets

THERMAL MANAGEMENT USING TOPOLOGICAL ISOMERIZATION OF FUEL

BACKGROUND

High performance aircraft require systems for thermal management and cooling. In typical modes of operation, fuel, lubricating oil for the engine, and hydraulic fluid used in the various hydraulic systems as well as the aircraft mounted accessory drive (AMAD) may require cooling. Additionally, the avionic systems of the aircraft will require cooling during operation, some by a liquid coolant and others by cool air. Concurrently, at low altitude or on the ground or at other relatively high temperature operating environments, the aircraft cabin requires cooling while at relatively low temperature altitudes such as at cruise altitude for a jet aircraft, the cabin will require warming. Through all of this it is generally desirable to heat the fuel delivered to the main propulsion engines to maximize the efficiency of the engines.

The low quality waste heat from avionics, air conditioning, etc. in aircraft is customarily transferred to fuel in a tank and then ejected from the aircraft via burning the fuel. This approach works well when the aircraft is burning fuel at a rate sufficient to keep the fuel tank temperature within design bounds. When the fuel tank temperature rises to a maximum design point, however, operations must be modified to allow the fuel to cool. Thus, high performance aircraft may have thermal limits equally confining as the more familiar operational limits such as the V-G envelope, service ceiling, fatigue limits, etc.

SUMMARY

Embodiments of systems are disclosed that include a heat source, an endothermic process module, and a fuel source configured to supply fuel to the endothermic process module and to receive isomerized fuel from the endothermic process module. A controller includes logic instructions operable to receive information regarding temperature of fuel received by the endothermic process module, and regulate application of heat from the heat source to the fuel at the endothermic process module. The endothermic process module includes a catalyst that isomerizes fuel from the fuel source to increase the thermal carrying capacity of the fuel without raising the temperature of the fuel.

Embodiments of a method are disclosed that includes receiving fuel from a fuel source, receiving heat from a heat source, combining the fuel with a catalyst, and applying the heat to isomerize the fuel. The catalyst and the heat topologically isomerizes the fuel and increase the thermal carrying capacity of the fuel.

In other embodiments, an aircraft includes an engine, a fuel tank configured to supply fuel to the engine, and an engine controller. The engine controller regulates cooling of onboard components using the fuel from the fuel tank, receives information regarding temperature of the fuel in the fuel tank, and controls the supply of fuel to the engine. A catalyst component is used to combine the fuel with a catalyst and isomerize the fuel through application of heat from the onboard components to increase the thermal carrying capacity of the fuel.

BRIEF DESCRIPTION OF THE FIGURES

Embodiments of the present invention may be better understood, and their numerous objects, features, and advantages made apparent to those skilled in the art by referencing the accompanying drawings. The use of the same reference symbols in different drawings indicates similar or identical items.

DETAILED DESCRIPTION

System and methods are disclosed that use hydrocarbon fuel directly from a fuel tank, or alternatively from a separate source, depending on the particular application, and transmute the hydrocarbon fuel from one topology to another, thus consuming waste heat without raising the temperature of the resulting topologically isomerized fuel. Depending on the isomer used, the thermal carrying capacity of a fuel may increase by 30% or more.

Figure 1:
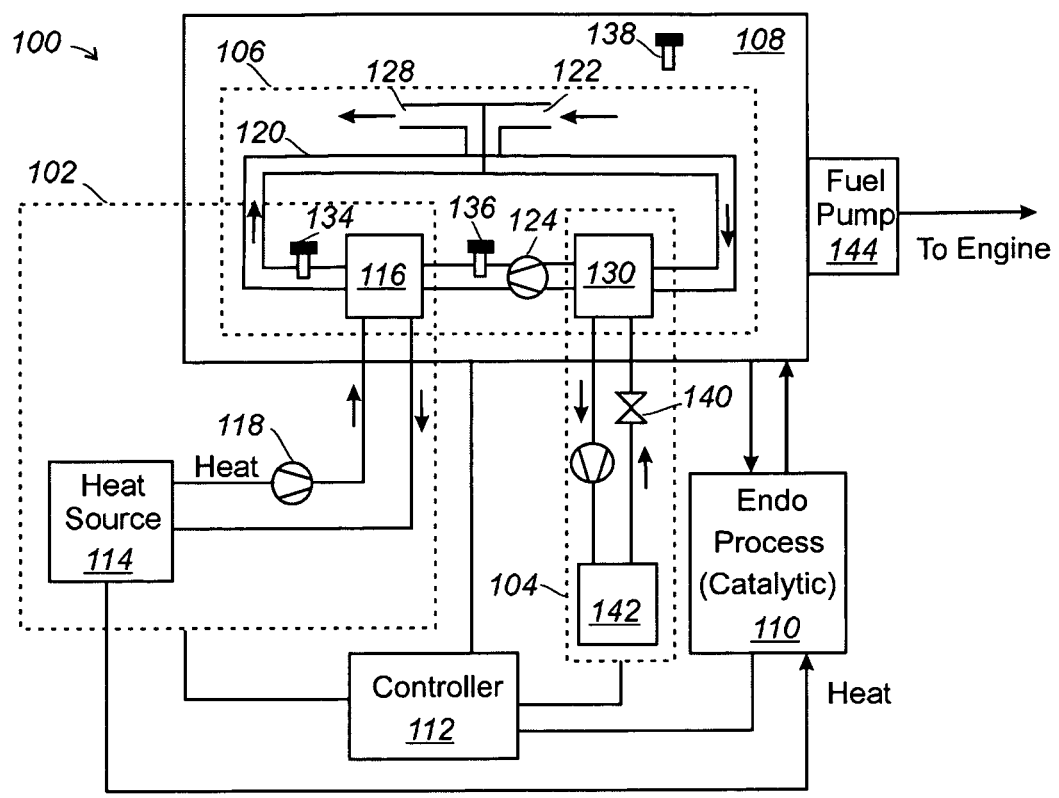
FIG. 1 is a schematic diagram of an embodiment of a system that increases the thermal carrying capacity of fuel using waste heat and a catalyst to topologically isomerize the fuel.

Referring to FIG. 1, a schematic diagram of an embodiment of system 100 is shown that increases the thermal carrying capacity of fuel by using waste heat and a catalyst to topologically isomerize the fuel. System 100 includes equipment cooling circuit 102, vapor cooling circuit 104, fuel circuit 106 within fuel tank 108, topological endothermic process module 110, and controller 112. Endothermic process module 110 uses a catalyst and absorbs waste heat to topologically isomerize fuel from fuel tank 108. Fuel circuit 106 is coupled to equipment cooling circuit 102 and vapor cooling circuit 104. Controller 112 is coupled to send and receive sensor information and control signals to and from equipment cooling circuit 102, vapor cooling circuit 104, and fuel circuit 106. Sensor information can include temperatures, flow rates, and other parameters required to control operation of components in equipment cooling circuit 102, vapor cooling circuit 104, fuel circuit 106, and fuel tank 108. Controller 112 executes logic instructions and can be embodied in any suitable computing device(s) using any suitable combination of hardware, software, and/or firmware, such as microprocessors, Field Programmable Gate Arrays (FPGAs), Application Specific Integrated Circuit (ASICs), or other suitable devices and/or software modules.

Equipment cooling circuit 102 typically circulates a liquid coolant between heat source 114 and heat exchanger 116. In the heat source 114, heat is transferred from onboard equipment to the coolant. Onboard equipment in heat source 114 can generate heat that may limit operation of electronic components such as semiconductors if adequate cooling is not provided. The equipment of heat source 114 can include communication systems, navigation systems, cockpit display systems, aircraft flight control systems, collision-avoidance systems, weather systems, aircraft management systems, and mission and tactical avionics and sensors including air and ground RADAR, SONAR, Forward Looking Infrared (FLIR), Passive Infrared Devices (PIDS), weapon systems, and electronic support measures and defensive aids. The coolant normally flows through cooling plates or ducts which are in thermal contact with the heat from the onboard equipment. The coolant is conducted to heat exchanger 116 by pump 118. Heat exchanger 116 is positioned along a fuel flow path 120 in fuel circuit 106, which allows heat from the coolant to be transferred to the fuel. The coolant is then circulated back to the heat source 114 for continued cooling of the onboard equipment.

Controller 112 regulates transfer of low grade waste heat generated at heat source 114 to fuel circuit 106. Vapor cooling circuit 104 transfers heat from fuel flow path 120 of fuel circuit 106. Fuel circuit 106 transfers heat from equipment cooling circuit 102 to fuel tank 108, and to vapor cooling circuit 104.

Fuel circuit 106 is typically located inside fuel tank 108. Fuel from fuel tank 108 enters fuel flow path 120 through a fuel circuit inlet 122 and is conducted around fuel flow path 120 by pump 124. Heat removed from the equipment in heat source 114 is transferred to fuel in fuel flow path 120 via heat exchanger 116. The heated fuel exits fuel flow path 120 through a fuel circuit outlet 128 into fuel tank 108.

Controller 112 monitors the temperature of the fuel. Temperature sensors 134, 136 provided in fuel flow path 120 register the fuel temperature after heat exchanger 116, and between heat exchanger 116 and evaporator 130, respectively. Temperature sensor 138 provided in fuel tank 108 registers the fuel temperature in fuel tank 108. Data from temperature sensor 134, 136, 138 is provided to controller 112. Controller 112 sends signals to operate pump 118, heat exchanger 116, evaporator 130, and condenser 142 to achieve desired a temperature of the fuel. If the fuel temperature rises above the threshold level, the fuel can be cooled to meet the temperature requirement of the equipment cooling circuit 102 using vapor cooling circuit 104, in which the fuel in fuel flow path 120 is cooled in evaporator 130.

Evaporator 130 is located inside fuel tank 106. Refrigerant in evaporator 130 is evaporated by heat from the fuel as the fuel is cooled. The evaporated refrigerant is conducted to condenser 142. Condenser 142 condenses the refrigerant to remove heat from the refrigerant. The condensed refrigerant is then conducted to evaporator 130 via expansion valve 140. Note that vapor cooling cycle 104 drains energy to operate whereas endothermic process module 110 only requires a catalyst to significantly increase the fuel's capacity to absorb heat. Thus, in some embodiments, endothermic process module 110 may be used as a primary cooling source and may even eliminate or at least reduce reliance on vapor cooling cycle 104 as a primary source of cooling.

The capacity of vapor cooling cycle 104 is ideally selected to maintain the temperature of fuel in fuel flow path 120 at an appropriate level at the inlet of heat exchanger 116. In some instances, the capacity of equipment cooling circuit 102 and vapor cooling cycle 104 can be exceeded, forcing the crew of the aircraft to modify use of onboard equipment until the fuel returns to a lower temperature. To help alleviate the requirement to curtail operation, endothermic process module 110 can be used to further offload heat from heat source 114 by isomerizing the fuel from fuel tank 108 using a catalyst and heat from heat source 114. The topological isomerization of fuel in endothermic process module 110 significantly increases the fuel's ability to absorb heat from heat source 114.

Controller 112 can also be configured to send command signals to fuel pump 144 to supply fuel to one or more engines as required to achieve and maintain desired speed of the vehicle in which the engines are installed. The temperature of the fuel can be provided to controller 112 by temperature sensor 138, and controller 112 can adjust operation of components in equipment cooling circuit 102, vapor cooling circuit 104, fuel circuit 106, and endothermic process module 110 to achieve the desired temperature of fuel supplied to the engine(s). Additionally, controller 112 can be one of many commercially available engine controllers 112 currently installed in a vehicle. To alleviate the need to modify or change controller 112, a separate controller (not shown) may be included in system 100 to interface with endothermic process module 110 and offload excess heat from heat source 114 that cannot be dissipated by equipment cooling circuit 102 and vapor cooling circuit 104 alone. For example, each engine can be equipped with a Full Authority Digital Electronic Controller (FADEC), and a separate controller 112 can be included in system 100 to control operation of endothermic process module 110 and other suitable components. Controller 112 can be configured to interface and operate cooperatively with the FADEC(s), or operate autonomously based on information provided by temperature sensors and other components in system 100.

Controller 112 can receive information regarding the temperature of isomerized fuel output by endothermic process module 110 and regulate application of heat from heat source 114 to endothermic process module 110. Endothermic process module 110 provides isomerized fuel to an engine. Controller 112 executes logic instructions to receive information regarding temperature of the isomerized fuel provided to the engine, and cause heat from heat source 114 to be applied to the isomerized fuel provided to the engine to regulate the temperature of the isomerized fuel.

The heat supplied by heat source 114 is typically low quality heat from the silicon transistors operating at or below 80 degrees Celsius or other suitable temperature. With such relatively low temperatures (compared to operating temperatures of the engine) the topologically isomeric reaction in endothermic process module 110 does not break the bonds the molecules in the hydrocarbon fuel, but rather rearranges the molecules of one hydrocarbon structure to another. Higher temperatures can be used, but temperatures higher than approximately 80 degrees Celsius are not required. Endothermic process module 110 absorbs waste heat to cause isomerization of the fuel without raising the temperature of the fuel. Thus the endothermic process increases the ability of the fuel to absorb heat as the fuel is transformed into a topological isomer of the fuel.

Figure 2:
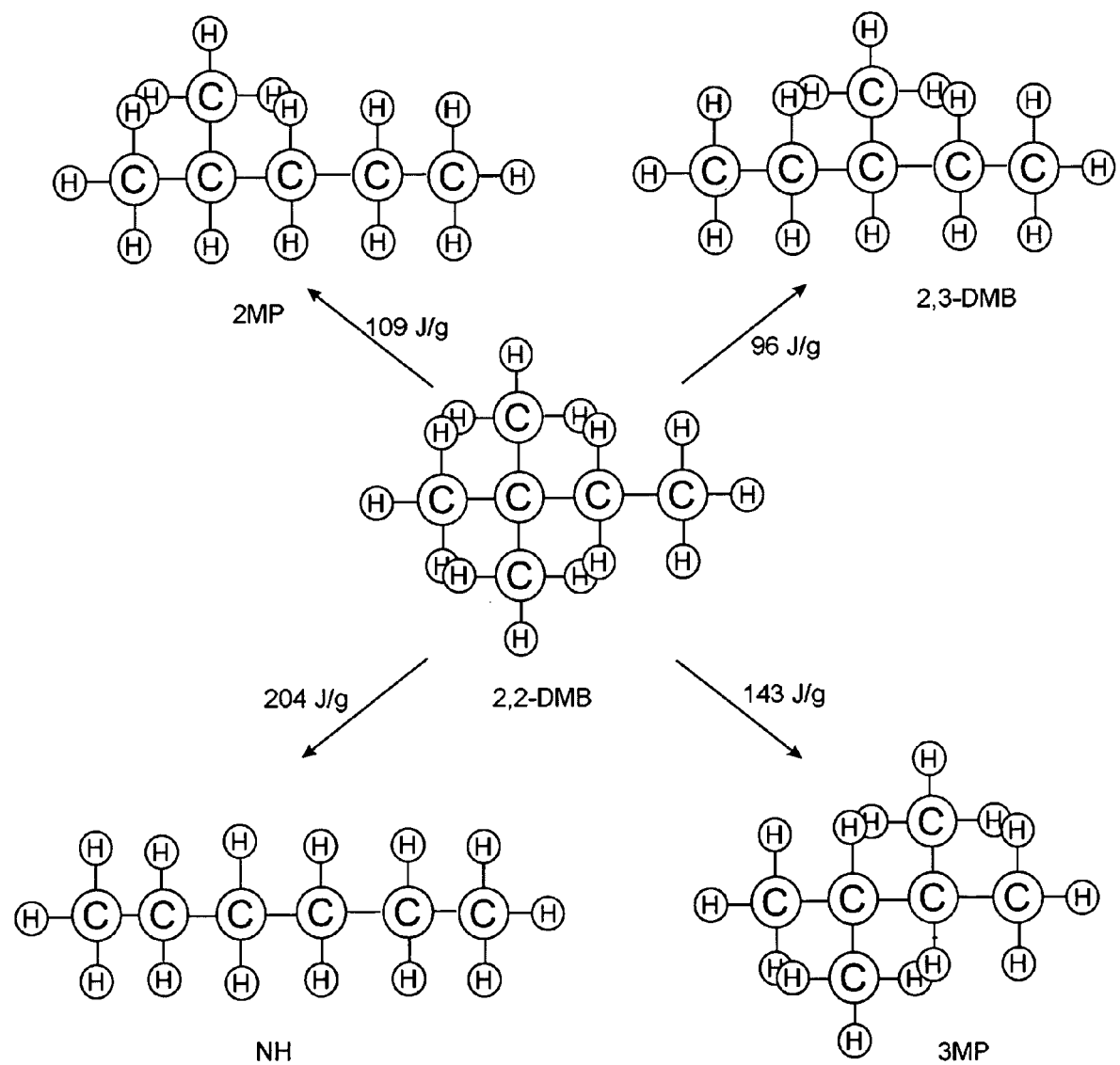
FIG. 2 shows examples of isomers of di-methyl butane (2,2-DMB) and the energy required to obtain each isomer.

FIG. 2 shows chemical structure diagrams for various isomers of 2,2 dimethyl-butane (2,2-DMB) including 1 methyl-pentane (2 MP), n-hexane (NH), 3 methyl-pentane (3 MP), and 2,3 dimethyl-butane (2,3-DMB). The isomers have the same number of carbon and hydrogen atoms in each molecule but the atoms are rearranged due to the reaction with a catalyst and heat. For example, 2,2-DMB requires 109 Joules/gram (J/g) to isomerize to 2 MP, 204 J/g to isomerize to NH, 143 J/g to isomerize to 3 MP, and 96 J/g to isomerize to 2,3-DMB. Although different amounts of energy are typically required to achieve different isomers, the fuel and the catalyst can be chosen so that the heat energy can be applied in the endothermic reactions without raising the temperature of the isomers. In some embodiments, the fuel to be isomerized can be added to a fuel which is typically used to operate an engine. For example, for a jet aircraft engine, a mixture of eighty-five (85) percent Jet-A fuel can be mixed with fifteen (15) percent 2,2-DMB. The Jet-A mixed with 2,2-DMB can absorb more heat from heat source 114 compared to Jet-A alone. The energy required to go from 2,2-DMB to any one of the other isomers requires only the absorption of energy (of which heat is one form, but not the only form that would suffice). The catalyst is required only to speed the reaction rate. That is, the reaction occurs without a catalyst but the rate may be too slow to match the rate at which heat is produced if the catalyst is not used. So the type of isomerization determines the energy that can be absorbed (per gram or per mole or per molecule, etc), the catalyst determines the rate at which energy is absorbed and thus the power (the energy rate) that can be absorbed. Other ratios, types, and combinations of fuel, catalyst(s), and amounts of heat can be used. Also, isomerization reaction rates increase as temperature increases, therefore, less catalyst and smaller endothermic process modules 110 may be used at higher temperatures. Similarly, isomerization reaction rates increase as the surface area of the catalyst particles increases, therefore, the amount of catalyst required can vary with the surface area of the catalyst.

Examples of catalysts that can be suitable for use in endothermic process module 110 include variation of sulfated zirconia (SZ) such as sulfation of zirconium hydroxide, zirconia synthesis in the presence of sulfuric acid, templated SZ, Platinum promoted SZ, magnesium or iron promoted SZ, copper promoted SZ, platinum on sulfated zirconia/alumina (SZA), trifluoromethanesulfonic acid, tetrafluoromethanesulfonic acid, antimony pentafluoride, and isopropanol dehydrogenation on ruthenium, among others.

The concept of topological isomerization for thermal management of aircraft and other systems can be illustrated using well-established mathematical models for the thermodynamic changes that take place in mixtures of molecules with different shape parameters. A simple case is given in Flory-Huggins theory for the mixture of a polymer and a solvent, which takes into account the great dissimilarity in molecular sizes in adapting the usual expression for the entropy of mixing. The result is an equation for the Gibbs free energy change $\Delta G_m$ for mixing a polymer with a solvent. The standard equation for the Gibbs free energy change accompanying mixing at constant temperature and (external) pressure is:

$$\Delta G_m = \Delta H_m - T \Delta S_m$$

where the change, denoted by $\Delta$, is the value of a variable for a solution or mixture minus the values for the pure components considered separately, $\Delta H_m$ is the enthalpy increment, and $\Delta S_m$ is the entropy increment. The result obtained by F-H is given by:

$$\Delta G_m/k_B T = (n_1 \Phi_2 \chi_{12} + n_1 \cdot \ln \phi_1 + n_2 \cdot \ln \phi_2)$$

where $n_1$ is the number of molecules (or mole fraction) and $\phi_1$ the volume fraction of component 1, and $n_2$ is the number of molecules (or moles) of component 2 whose volume fraction is $\phi_2$, with the introduction of a parameter chi X to take account of the energy of interdispersing components 1 and 2.

F-H illustrates the general principle, also found in the theories of enzyme catalysis and protein folding, that the entropy of any component is the sum of its translational, rotational and internal entropies. In general, the entropies of rotation and translation are quite high (120 J/deg/mol) while internal entropies are an order of magnitude lower. The translational entropy of a molecule is proportional to the volume occupied by the molecule and inversely proportional to concentration of the molecule in a solution. Topological isomerization enables a solution of fuel molecules and their topological isomers to store more energy (increasing $\Delta G_m$) without necessarily increasing the temperature by decreasing the entropy ($\Delta S_m$) while holding temperature constant. The entropy is reduced by changing the shape of the molecule, for example, by folding the molecule in half (or a host of any other topological transmutations), so that the molecule occupies a small volume. A similar additional decrease in entropy is achieved by constraining the rotation of molecule; again by folding or some like process that has the effect of confining the molecule against free rotation.

Topological isomerization is a process which, in the simplest case, takes a homogeneous material (e.g., a hydrocarbon where every molecule is the same or nearly so) into a heterogeneous mixture of materials by transmuting some of the initial molecules into new molecules of the same number of atoms and bonds, but refashioning the molecules into a different topological configuration. The transmutation is a topological phase change. The portion of original material that is thus transmuted into a new phase is given by $n_1$ and the portion remaining by $n_2$ (where $n_1 + n_2 = 1$). Then it can be useful to understand $\ln \phi_1$ and $\ln \phi_2$ as parameters of the respective topological phases.

When a 'topological diversity factor' given by the ratio between $\ln \phi_1$ and $\ln \phi_2$ diverges from some norm, the Gibbs energy differs from its norm; that is, when the topological diversity is large, the Gibbs energy changes (i.e., $\Delta G_m \neq 0$) and can increase or decrease. The fact that the temperature is normalized out of this analysis reflects the fact that energy can be added via topological transmutation (isomerization) with or without raising the temperature of the mixture.

Based on F-H theory, classes of catalysts that are likely to be successful at exploiting a host of bond types, not just the strong covalent types, can include enzymes and/or enzymatic-like approaches (e.g., shaped laser pulses can serve a catalytic function). With bond types, interaction zones store potential energy in a configuration of electrostatic force fields. In general, the isomerization process uses quasi-bonds (reserving the word "bond" for electron pair sharing) that can be adjusted to various strengths by topological changes other than making and breaking high energy covalent bonds, such as lengthening or shorting the inter-atomic distances, changing the angles of the covalent bonds, and so forth. Topological changes generally occur in steps, each with its own activation energy followed by its own (somewhat lower) transition energ. The total activation energy of a strictly topological reaction is much lower than that of the bond-breaking reactions. Covalent bonds typically exhibit energies of hundreds of kilojoules per mole versus the hundreds of joules per mole of topological ligatures. The lower energy and temperatures generally indicate that optimum functionality is achieved by selecting catalytic systems that operate best at hundreds of joules per mole.

The field of catalysis chemistry that most closely applies is that of protein biochemistry. Enzymes, like other catalysts, provide access to more reaction routes and, by stabilizing intermediate states, can reduce the integrated energy required for a reaction to reach the highest energy transition state on the a reaction route. Moreover, because bio-systems generally operate within a few degrees of some nominal value, the effective energy boost of catalysis is modest and so many of the reactions are not predominantly chemical in the strict sense but are topological or, as the biologists say, conformational. Types of enzymatic catalysis that can apply include catalysis by bond strain, catalysis by proximity and orientation, electrostatic catalysis, and quantum tunneling.

The embodiment of system 100 in FIG. 1 shows endothermic process module 110 outside fuel tank 108 and configured to receive waste heat from heat source 114. Fuel is provided to endothermic process module 110 from fuel tank 108, and endothermic process module 110 outputs isomerized fuel to fuel tank 108. Although the temperature of fuel in fuel tank 108 is not affected by the isomerized fuel, the endothermic process module 110 absorbs additional heat from heat source 114 and thus allows the onboard equipment greater operational flexibility than offered by the combination of equipment cooling circuit 102 and vapor cooling circuit 104 alone.

Figure 3:
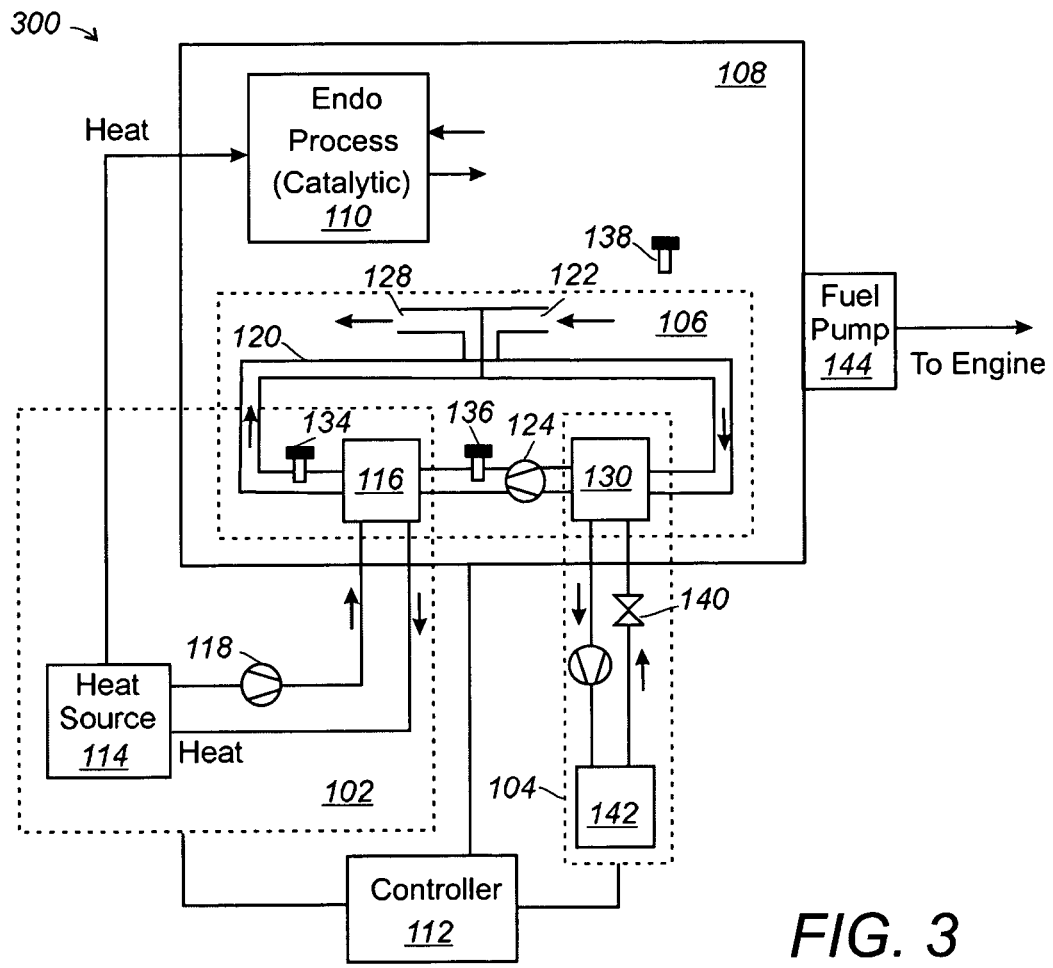
FIG. 3 is a schematic diagram of another embodiment of a system that increases the thermal carrying capacity of fuel using waste heat and a catalyst to topologically isomerize the fuel.

FIG. 3 shows another embodiment of a system 300 that increases the thermal carrying capacity of fuel using waste heat and a catalyst to topologically isomerize the fuel. System 300 is similar to system 100 (FIG. 1) except endothermic process 110 is positioned inside fuel tank 108. Endothermic process module 110 receives fuel from fuel tank 108 and outputs isomerized fuel to fuel tank 108. Controller 112 executes logic instructions to receive information regarding temperature of fuel received by endothermic process module 110, and regulate application of heat from heat source 114 to the fuel at endothermic process module 110. Endothermic process module 110 includes a catalyst that isomerizes fuel from fuel tank 108 to increase the thermal carrying capacity of the fuel. The temperature of the mixture of isomerized fuel and unisomerized fuel in fuel tank 108 can be provided to controller 112 by temperature sensor 138.

A refrigeration component such as vapor cooling circuit 104 is coupled to fuel tank 108 and controller 112. Vapor cooling circuit 104 converts fuel vapor from the fuel source (fuel tank 108) to high temperature liquid fuel. Endothermic process module 110 can be configured to isomerize either fuel vapor or liquid fuel, and can reside internal or external to the fuel tank 108.

Figure 4:
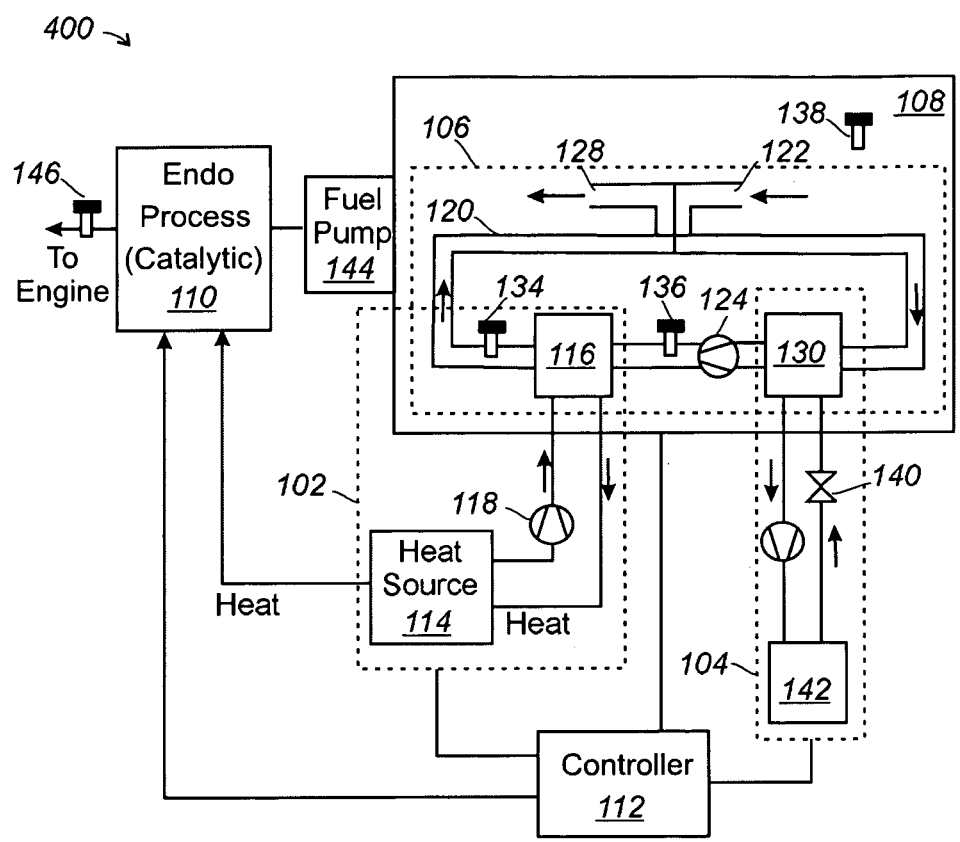
FIG. 4 is a schematic diagram of another embodiment of a system that increases the thermal carrying capacity of fuel using waste heat and a catalyst to topologically isomerize the fuel.

FIG. 4 shows another embodiment of a system 400 that uses heat and a catalyst in endothermic process module 110 to topologically isomerize fuel. System 400 is similar to systems 100 (FIG. 1) and system 300 (FIG. 3) except endothermic process 110 is positioned outside fuel tank 108 before the fuel is provided to the engine. A heat source 114 can be provided by onboard equipment, however other sources of heat can be used. Endothermic process module 110 receives fuel from fuel tank 108 and outputs isomerized fuel to the engine. Controller 112 executes logic instructions to receive information regarding temperature of fuel received by endothermic process module 110, and regulate application of heat from heat source 114 to the fuel at endothermic process module 110. Endothermic process module 110 includes a catalyst that can isomerize fuel from fuel tank 108 when the catalyst and the fuel are subject to heated by heat from heat source 114. The temperature of the isomerized fuel can be provided to controller 112 by temperature sensor 146, and controller 112 can adjust the application of heat as the fuel exits the endothermic process module 110 as required to provide fuel to the engine at the desired temperature.

Figure 5:
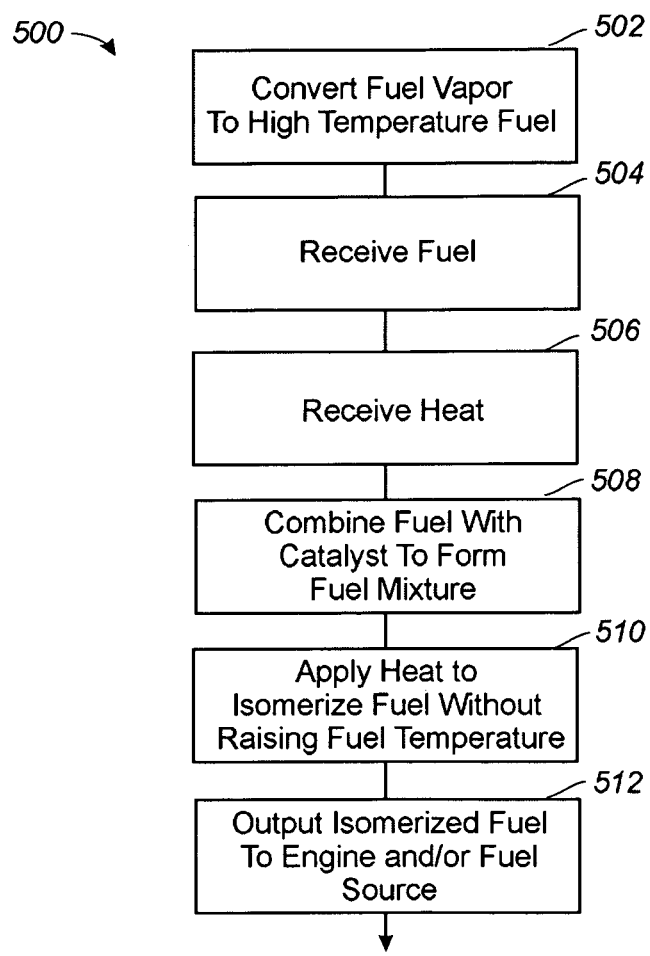
FIG. 5 is a schematic diagram of an embodiment of a method that increases the thermal carrying capacity of fuel using waste heat and a catalyst to topologically isomerize the fuel.

Referring to FIG. 5, an embodiment of a process 500 that can be performed by components in systems 100 (FIG. 1), 300 (FIG. 3), 400 (FIG. 4) for isomerizing fuel to increase the thermal carrying capacity of the fuel to absorb excess waste heat is shown. Process 502 can include converting fuel vapor from a fuel source to a high temperature liquid fuel. In other embodiments, the fuel vapor from the fuel source can be converted to high temperature fuel after combining the fuel with the catalyst, and even after at least a portion of the fuel has been isomerized.

Process 504 can include receiving at least a portion of the fuel (either vapor or liquid) in a module (such as endothermic process module 110) that is configured to isomerize the fuel. Process 506 can include receiving heat from heat source 114, such as avionics equipment or other suitable source. Process 508 can include combining the fuel with a catalyst. Process 510 can include applying the heat to topologically isomerize the fuel and increase the thermal carrying capacity of the fuel. A controller can be used to receive information regarding temperature of the fuel in the fuel source and regulate application of the heat to the fuel at the fuel source as well as endothermic process module. Process 512 can include outputting the isomerized fuel to an engine and/or to the fuel source. In some configurations, a portion of the fuel can be provided to the engine while the remaining portion is returned to the fuel source. A controller can be used to receive information regarding the temperature of the isomerized fuel output by an endothermic process module, and regulate application of heat from the heat source to the endothermic process module before the isomerized fuel is supplied to the engine or returned to the fuel source.

Figure 6:
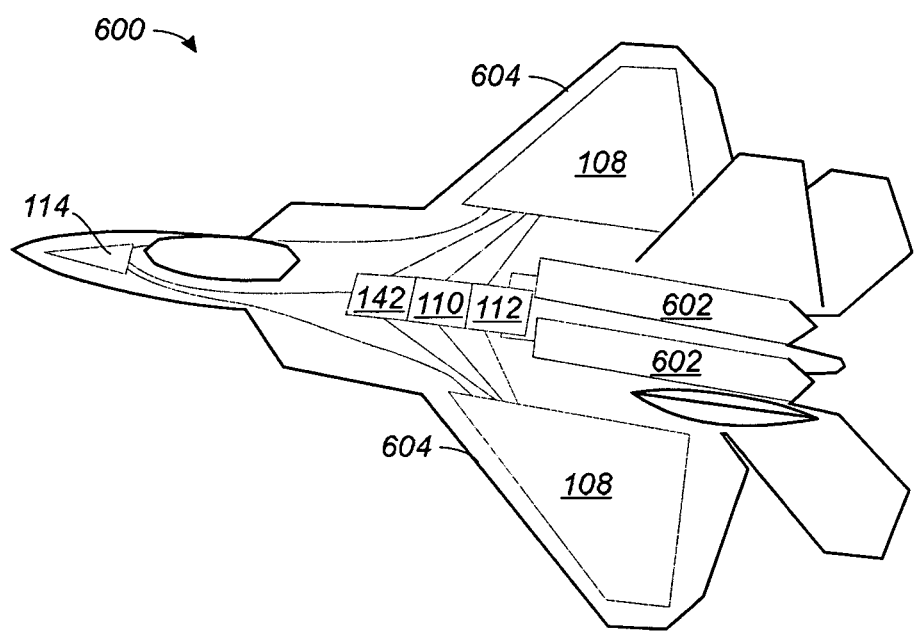
FIG. 6 shows a top view of an embodiment of an aircraft in which a system that increases the thermal carrying capacity of fuel using waste heat and a catalyst to topologically isomerize the fuel can be used.

FIG. 6 shows a top view of an embodiment of an aircraft 600 in which a system 100 (FIG. 1), 300 (FIG. 3), 400 (FIG. 4) and process 500 (FIG. 5) that uses a catalyst to dissipate excess waste heat by isomerizing fuel. Dashed outlines are used to show some of the components inside aircraft 600 including two engines 602, fuel tanks 108 embedded in wings 604, engine controller 112, endothermic process module 110 (also referred to as "a catalyst component"), condenser 142 (also referred to as a "refrigeration component"), and heat source 114. Condenser 142 is part of vapor cooling circuit 104 (FIG. 1) that can also include evaporators 130 (FIG. 1) in fuel tanks 108.

Engines 602 can be jet engines, turbofan engines, or other suitable propulsion systems that operate on hydrocarbon fuels. Fuel tanks 108 store fuel for operating engines 602 and can be embedded in wings 604 or other locations in airplane 600, as well as mounted in other locations internal and/or external to aircraft 600. Fuel hoses and command/data signal lines can be coupled between engines 602, fuel tanks 108, engine controller 112, endothermic process module 110, condenser 142, and heat source 114 as required to allow engine controller 112 to regulate cooling of onboard components in heat source 114 using the fuel from the fuel tanks 108. Controller 112 can control the application of waste heat and flow of fuel to and from endothermic process module 110, condenser 142, heat source 114, fuel tanks 108, and engines 602. Endothermic process module 110 includes a catalyst to isomerize the fuel through application of waste heat from the onboard components in heat source 114 or other location in aircraft 600.

Note that systems 100 (FIG. 1), 300 (FIG. 3), 400 (FIG. 4) and process 500 (FIG. 5) can be used in other types of vehicles that include hydrocarbon-fueled engines other than aircraft. Further, source(s) of waste heat can be supplied by components other than avionics.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Variations and modifications of the embodiments disclosed herein may also be made while remaining within the scope of the following claims. The functionality and combinations of functionality of the individual modules can be any appropriate functionality. Additionally, limitations set forth in publications incorporated by reference herein are not intended to limit the scope of the claims. In the claims, unless otherwise indicated the article "a" is to refer to "one or more than one".

I claim:

1. A system for cooling equipment onboard an aircraft using an engine fuel comprising a first isomer capable of being endothermally converted to one or more second isomers, the system comprising:
   a fuel tank configured to contain the fuel;
   a catalyst that increases the rate of isomerizing the first isomer into the one or more second combustible isomers,
   a process chamber thermally coupled to the equipment onboard the aircraft, the process chamber containing the catalyst and having an outlet; and
   a pump coupled between the fuel tank and the process chamber and configured to selectable transfer the fuel from the fuel tank through the process chamber and out through the outlet,
   wherein a portion of the first isomer endothermally isomerizes from the first isomer into the one or more second isomers upon receiving heat from the onboard equipment while within the process chamber and in the presence of the catalyst, thereby cooling the onboard equipment without raising a temperature of the fuel.

2. The system of claim 1, further comprising a conduit from the outlet of the process chamber to an engine arranged such that fuel that flows out of the outlet flows to the engine.

3. The system of claim 1, wherein the process chamber is located within the fuel tank and arranged such that fuel that flows out of the outlet returns to the fuel tank.

4. The system of claim 1, further comprising a conduit from the outlet to the fuel tank arranged such that fuel that flows out of the outlet returns to the fuel tank.

5. The system of claim 1, wherein the catalyst comprises a sulfated zirconia.

6. An aircraft comprising:
   an engine;
   a fuel tank configured to supply fuel to the engine;
   an engine controller configured to:
      regulate cooling of onboard components using the fuel from the fuel tank;
      receive information regarding temperature of the fuel in the fuel tank;
      control the supply of fuel to the engine; and
   a catalyst component that combines the fuel with a catalyst and isomerizes the fuel through application of heat from the onboard components to increase the thermal carrying capacity of the fuel.

7. The aircraft of claim 6, further comprising:
   a refrigeration component coupled to the fuel tank and the catalyst component, the refrigeration component is operable to convert fuel vapor from the fuel tank to high temperature fuel, and provide the high temperature fuel to the catalyst component.

8. The aircraft of claim 6, further comprising
   the fuel source includes a mixture of two different types of fuel, one of the types of fuels is isomerized with the catalyst and the heat.

9. The aircraft of claim 6, further comprising:
   the onboard components include avionics equipment.

10. An aircraft comprising:
    a fuel tank configured to contain a fuel comprising a first isomer capable of being endothermally converted to one or more second isomers;
    an engine configured to operate using the fuel;
    heat-generating equipment;
    a process chamber thermally coupled to the heat-generating equipment, the process chamber having an outlet;
    a catalyst that increases the rate of isomerizing the first isomer into the one or more second combustible isomers, the catalyst disposed within the process chamber; and
    a pump coupled between the fuel tank and the process chamber and configured to selectably transfer the fuel from the fuel tank through the process chamber and then out through the outlet, wherein a portion of the first isomer endothermally isomerizes from the first isomer into the one or more second isomers upon receiving heat from the heat-generating equipment while within the process chamber and in the presence of the catalyst, thereby cooling the heat-generating equipment without raising a temperature of the fuel.

11. The aircraft of claim 10, further comprising a conduit from the outlet to the fuel tank arranged such that fuel that flows out of the outlet returns to the fuel tank.

12. The aircraft of claim 10, further comprising a conduit from the outlet to the engine arranged such that fuel that flows out of the outlet flows to the engine.

13. The aircraft of claim 10, wherein the process chamber is disposed within the fuel tank and arranged such that fuel that flows out of the outlet returns to the fuel tank.

14. The aircraft of claim 10, further comprising an equipment cooling loop that comprises:
    a heat exchanger disposed within the fuel tank;
    first and second coolant conduits coupled between the heat exchanger and the heat source;
    a liquid coolant; and
    a coolant pump disposed in the first coolant conduit and configured to circulate the coolant from the heat source through the first coolant conduit and then through the heat exchanger and then back through the second coolant conduit to the heat source, thereby transferring heat from the heat source to the fuel within the tank.

15. The aircraft of claim 10, further comprising a vapor cooling circuit that comprises:
    an evaporator disposed within the fuel tank;
    a condenser;
    first and second refrigerant conduits coupled between the evaporator and the condenser;
    a refrigerant; and
    a refrigerant pump disposed in the first refrigerant conduit and configured to circulate the refrigerant from the evaporator through the first refrigerant conduit and then through the condenser and then back through the second refrigerant conduit to the evaporator, thereby cooling the fuel within the tank.

16. The aircraft of claim 10, wherein the catalyst comprises a sulfated zirconia.

* * * * *